Oct. 5, 1965     L. T. HENDRIX     3,209,519

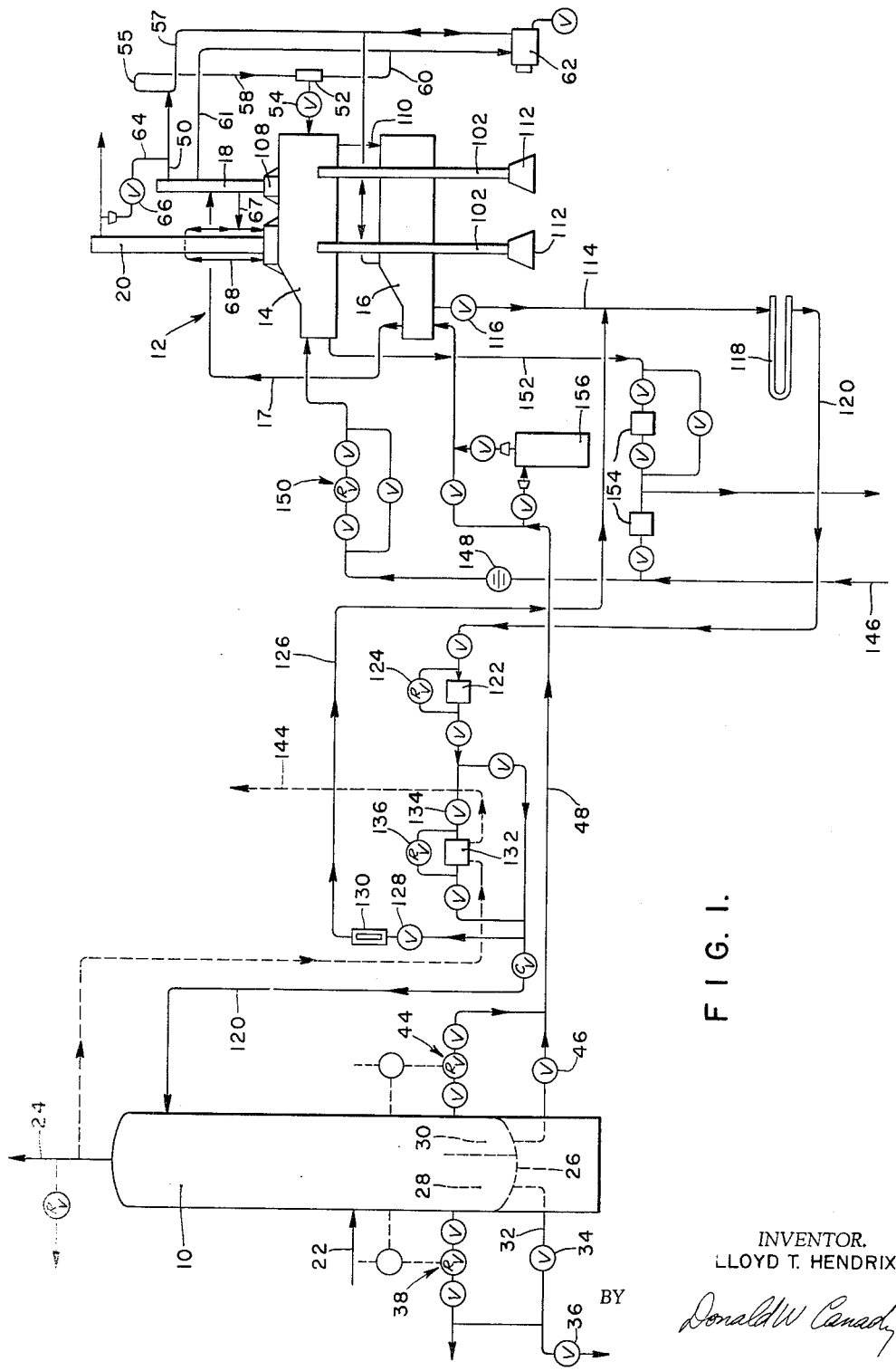
FIG. I.
INVENTOR.
LLOYD T. HENDRIX
BY
Donald W. Canady
ATTORNEY.

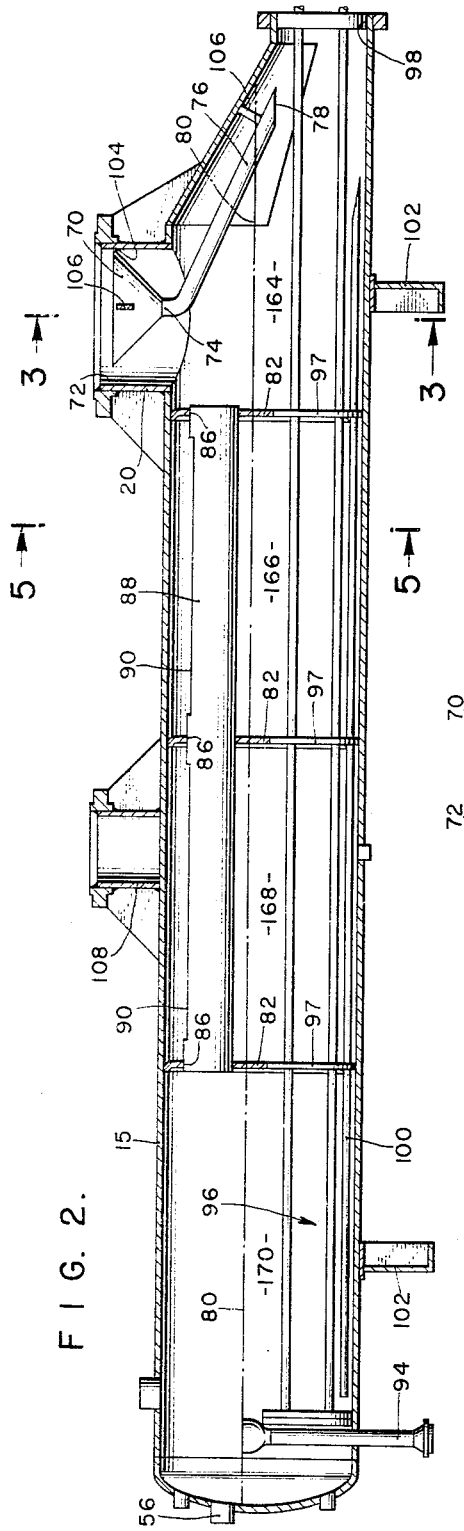

ABSORPTION PROCESS AND APPARATUS

Filed Dec. 23, 1960     3 Sheets-Sheet 3

INVENTOR.
LLOYD T. HENDRIX
BY Donald W. Canady
ATTORNEY.

United States Patent Office
3,209,519
Patented Oct. 5, 1965

3,209,519
ABSORPTION PROCESS AND APPARATUS
Lloyd T. Hendrix, Santa Ana, Calif., assignor to Richfield Oil Corporation, Los Angeles, Calif., a corporation of Delaware
Filed Dec. 23, 1960, Ser. No. 78,019
4 Claims. (Cl. 55—44)

The present invention relates to the dehydration of moisture-laden natural gas by absorption of water vapors with a liquid absorbent. More particularly this invention relates to a method and apparatus for regenerating a liquid absorbent which has previously been employed to dehydrate a moisture-laden natural gas stream.

There are many known methods for the dehydration of natural gas, but recently dehydration by absorption by glycol solutions has achieved much attention. A typical prior art glycol absorption installation for dehydrating natural gas includes an inlet-gas scrubber, an absorber, a fractionator and reboiler, intermediate heat exchangers, cooler, pumps, and necessary controls. The prior art practices employ a fractionation column for reducing the water content of wet glycol to the level of 1 to 2 percent water so that a 96 to 98 percent glycol solution can be returned to the absorption unit. This fractionation process for the regeneration of wet glycol however, requires substantial quantities of heat fed to the fractionation column from a reboiler in which glycol is vaporized by heating to temperatures of approximately 410 to 450 degrees Fahrenheit.

It has heretofore been suggested to introduce natural gas bled off from the dehydrated natural gas stream, into the reboiler so that the vapor pressure of the glycol necessary to regenerate the glycol in the reboiler is reduced whereby the glycol can be regenerated at a lower temperature, thus conserving heat and reducing degradation of the glycol which occurs more rapidly at higher temperatures. The quantity of such gas required to reduce the regeneration temperature of the glycol was sufficiently large to require taking a portion of the main natural gas stream for this use, and since this volume of gas was substantial, there was an excessive waste of gas as well as a disposal problem with the moist natural gas discharged from the reboiler vessel.

It is therefore a prime object of the present invention to provide an improved method and apparatus for regenerating liquid absorbent.

It is also an object of the present invention to provide apparatus and a method for dehydrating natural gas by absorption with a liquid absorbent whereby the amount of heat required to regenerate the diluted absorbent is reduced.

It is also an object of the present invention to reduce the temperature to which a liquid absorbent must be heated to reduce the water content to a given level.

It is also an object of the present invention to provide apparatus and a method to reduce the water content of a liquid absorbent to a given level whereby a reduced quantity of gas is required to lower the regeneration temperature of the liquid absorbent in the reboiler vessel.

It is a further object of the present invention to provide apparatus and a method for dehydrating a liquid absorbent solution utilizing gas to reduce the regeneration temperature of the absorbent in the reboiler by recovering the gas which has been dissolved in the absorbent during the absorption process and thus obviating the need for bleeding gas from the dehydrated natural gas stream.

It is also an object of the present invention to provide a process for dehydrating natural gas by absorption with a liquid absorbent whereby the use of a fractionating column to regenerate the diluted absorbent is eliminated.

It is a further object of the present invention to provide apparatus and a method for dehydrating natural gas by absorption with a glycol solution whereby the diluted glycol solution is regenerated in a reboiler-type vessel.

Other objects and fuller understanding of the invention may be had by referring to the following description and claims, taken in conjunction with the accompanying drawings in which:

FIGURE 1 shows a flow diagram of natural gas dehydrating plant employing my present invention;

FIGURE 2 shows in elevation the reboiler vessel utilized in my present invention;

FIGURE 3 shows an end elevation view of the vessel shown in FIGURE 2 taken on the plane 3—3;

FIGURE 5 shows in elevation a section taken on the plane 5—5 of FIGURE 2 showing a baffle used in the reboiler vessel;

FIGURE 6 is an enlarged view taken on section 6—6 of FIGURE 5 showing the manner in which the baffle shown in FIGURE 5 is welded to the reboiler vessel.

Figure 4:
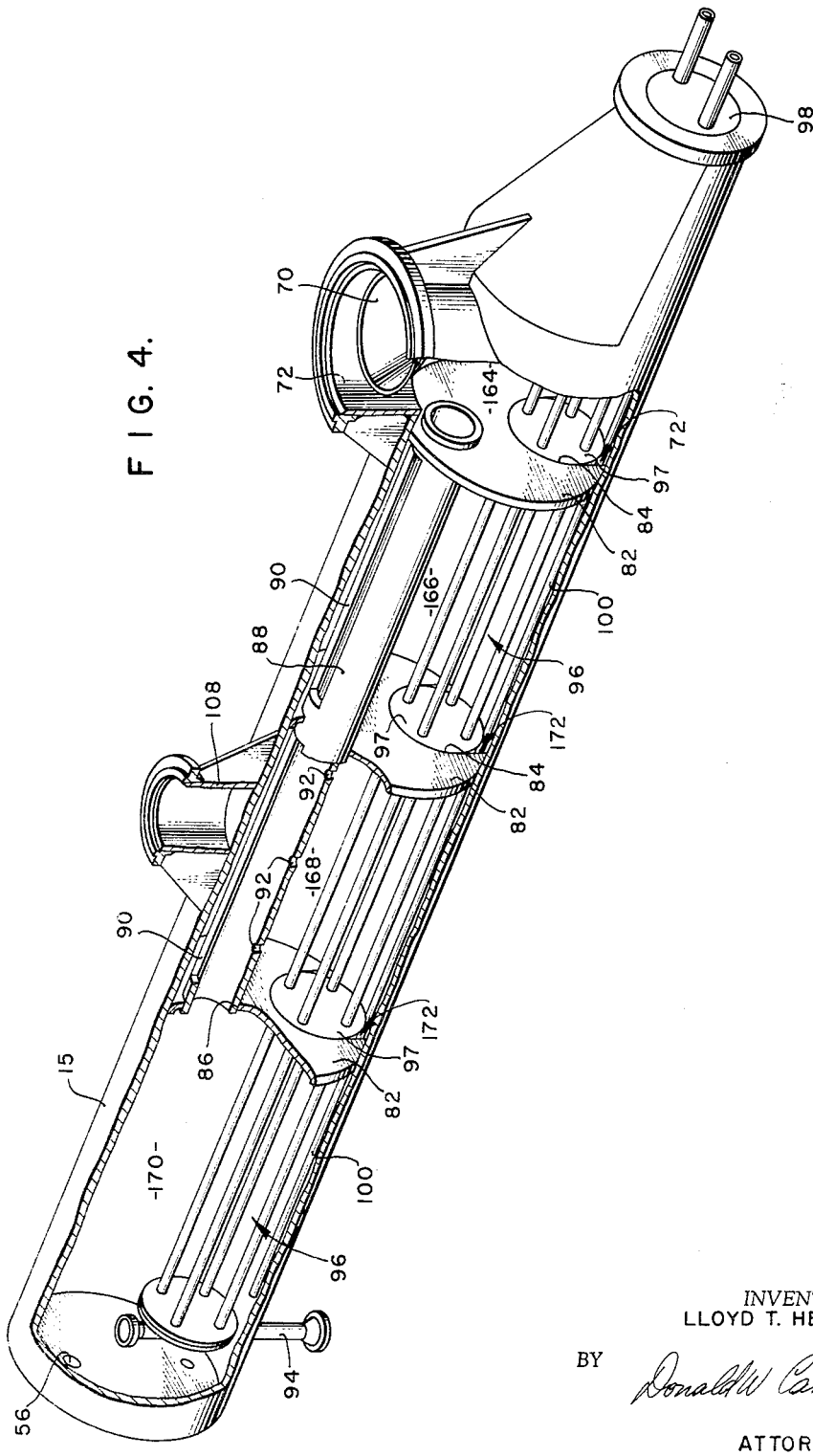
FIGURE 4 shows in partially cut away perspective the reboiler vessel shown in FIGURE 2.

Briefly described, the present invention relates to reducing the water content of a wet glycol solution used to dehydrate natural gas by absorption, in a compartmented reboiler-type vessel utilizing gases released from the wet glycol to substantially lower the boiling temperature of the glycol in the reboiler-type vessel by reducing the partial pressure in the vapor to thus cause the system to act as if the pressure were lower.

With reference to the drawings, FIGURE 1 shows the flow diagram of a process for dehydrating natural gas utilizing the present invention. Wet natural gas is fed into the absorber tower 10 where it is contacted with a dehydrating agent such as tri-ethylene glycol to absorb water from the natural gas stream, after which the dehydrated natural gas is discharged overhead from the absorber tower at 24. Wet glycol is withdrawn from the bottom of the absorber tower and processed to regenerate or reduce the water content of the wet glycol solution with the regenerating equipment shown generally at 12. After the wet glycol has been regenerated the lean glycol solution is cooled and pumped back into the absorber tower 10 near the top of the tower through line 120, for further use in dehydrating moisture laden natural gas. The regenerating equipment 12 consists of a reboiler vessel 14 and a glycol storage tank 16 which may be situated beneath the reboiler vessel 14, a flash and oil separator tank 18 in which dissolved gases are released from the wet glycol, and a still 20 used for removing glycol vapors from the moist gas leaving the reboiler vessel.

Moisture laden natural gas at well head pressure of from 500 to 1500 p.s.i.g. is charged into a conventional glycol absorber tower 10 through pipe 22 where it is passed through an inlet scrubber which is set as close as possible to the absorber in order to remove all free liquids and any suspended solids from the gas stream. The inlet scrubber in the equipment shown in FIGURE 1 is integral with the absorber tower 10 and is of any conventional mechanical type, preferably a wire mesh demister type scrubber. After passing through the scrubber section, the moisture laden natural gas is subjected to the action of a glycol solution which absorbs water from the natural gas. Conventional glycol absorber processes and equipment are aptly described in "Natural Gas and Natural Gasoline," R. L. Huntington, 1950, McGraw-Hill Book Co., Inc., pp. 348–379. As shown diagrammatically in phantom in FIGURE 1, the absorber tower 10 contains a plate 26 near the bottom of the vessel which is divided into a scrubber section 28 and a glycol surge section 30. The natural gas is first scrubbed with a wire mesh de-mister type scrubber to partially remove free liquids and particulate matter in the scrubber section and then passed to the glycol surge section where water vapor is removed from the natural gas by contact with a glycol solution. Dehydrated natural gas is discharged from the tank through overhead pipe 24. Free liquids and particulate matter are drained out of the scrubber section through line 32 and removed through suitable drain valves 34 and 36. The water drained through line 32 is principally water condensed prior to entering the scrubber section. The liquid level in the scrubber section may be controlled by a pneumatically operated valve assembly 38 which controls the removal of overflow condensate from the scrubber section 28 of the absorber tower 10. Likewise the liquid level in the glycol surge section 30 may be controlled by a pneumatically operated valve assembly 44 which, in conjunction with the drain valve 46, controls the removal of wet glycol from the absorber for transfer through line 48 to the regenerating unit 12.

The expressions "wet" or "rich" glycol refer to a water solution of diethylene glycol or triethylene glycol wherein the water content of the glycol solution exceeds the water content of the "lean" glycol pumped into the absorber tower through line 120 to absorb moisture from moisture laden natural gas fed into the unit. Generally, "wet" glycol discharged from the absorber tower 10 for regenerating, contains about 10% water and 90% glycol whereas "lean" glycol which is fed back into the absorber through pipe 120, contains 2–4% water and 98–96% glycol. In the glycol regenerating process the water content of the glycol solution is reduced from about 10% water to about 2% water. Although the apparatus and process described herein relates primarily to the regeneration of tri- and diethylene glycol the principles involved are also applicable to the regeneration of other liquid absorbents such as amine glycols or potassium carbonate used for sweetening and/or dehydrating natural gas.

Wet glycol from the absorber tower 10 is filtered with glycol filter 156 to remove solid patricles prior to introduction into the regenerating equipment 12. The wet glycol is passed through a heat exchanger unit in the glycol storage tank 16 where it is preheated, in the present case, to a temperature of approximately 220° Fahrenheit. The wet glycol is then passed through pipe 17 to a flash and oil separator tank 18 which may be supported on the reboiler vessel 14 by a support structure 108. Pressure is released in the flash tank and the gases which have dissolved in the glycol solution during the absorption process, come out of the glycol solution and are taken overhead through line 50 and then run at about atmospheric pressure through scrubber 52 to prevent carrying condensed heavy hydrocarbon liquids or water into the glycol in the reboiler. The scrubber 52 is a mechanical type scribber preferably of the wire mesh type. Valve 54 controls flow of scrubbed gas into the inlet 56 of the reboiler vessel. When it is necessary to shut down the scrubber 52, gases flashed from the wet glycol in the flash tank 18, may be piped through line 64 to overhead still gases by appropriate regulation of valves 54 and 66.

A pressure equalizing line 57 which maintains a constant pressure in the separated flashed gas line 58 which controls the flow of gas into the scrubber 52 and the reboiler vessel inlet 56, is provided with a liquid trap loop 55 to prevent hydrocarbon condensate from getting into the glycol in the reboiler vessel. Heavy hydrocarbons condensed in the flash tank 18 overflow through overflow pipe 61 into a drip accumulator 62. The glycol level in the flash tank 18 is maintained below the oil overflow pipe 61. Liquid hydrocarbons removed by the trap loop 55 drain through the pressure equalizing line 56 into the drip accumulator 62.

Wet glycol from which the dissolved vapors have been released by flashing in tank 18, is passed through line 67 into the reboiler tank 15 through an anti-siphon vent 68 which prevents the flash tank 18 from being syphoned. Wet glycol is transferred into the reboiler vessel 14 through the funnel 70 (FIG. 2), which is positioned closely adjacent the lower end of the base of still 20. The glycol solution then passes through a ceramic packing which provides contact with the gas and the upcoming water vapor and thus subjects the glycol to an initial water removal stage. The neck 74 of the funnel is fitted with an extension pipe 76 which has its lower end 78 positioned beneath the liquid level 80 in the reboiler vessel so as to discharge wet glycol into the reboiler vessel at the extreme end of the vessel below the liquid level. The extension pipe 76 is formed off-center to permit easy insertion of the heat exchange equipment 96 in the reboiler vessel. The funnel 70 which is supported in the reboiler opening 72 with a welded brace 106 and by spot welding as at 104, is somewhat smaller than the opening 72 in the reboiler vessel, thus permitting the vapors to rise around the funnel and go up into the still 20.

The reboiler vessel 14 is equipped with one or more baffles 82 which may be positioned in the reboiler vessel in a vertical manner so as to divide the interior of the reboiler vessel longitudinally into two or more compartments. As shown in FIGURES 2 and 4 three baffles are employed in the reboiler vessel shown to divide the vessel into four longitudinal compartments. As a practical matter in the regeneration of wet glycol, as in the present process, two baffles would be the minimum number of baffles, and three baffles the optimum number. The baffle 82 as best shown in FIGURE 5 has a "U" slot 84, removed from its lower central section below the intended liquid level 80 and has a circular hole 86 removed from the baffle above the liquid level. The baffle 82 may be suitably affixed to the inside of the reboiler shell 15 by welding as shown in FIGURE 6. A gas tube 88 having longitudinal slots 90 removed from the tube is positioned in the circular holes 86 provided in the baffles. The tubular member 88 is of sufficient length to extend through all of the baffles above the liquid level. The portion of the tube extending through the baffles is not slotted, thus aiding in the prevention of vapors from one compartment intermixing or back-mixing with the vapors in adjacent compartments. Small drain holes 92 are longitudinally spaced along the lower section of the tube, that is, the section of the tube diametrically opposite the longitudinally slots 90. These drain holes provide for disposal of condensate forming in the gas tube 88.

An overflow pipe 94 is positioned in the end of the reboiler vessel below the liquid level 80, opposite the end in which the wet glycol enters the vessel. A heat exchange bundle 96 which serves to heat the glycol in the reboiler vessel, is inserted through the flanged opening 98 and through the "U" slots 84 in the several baffles so that the heat exchange bundle extends from a point near the overflow pipe 94 at one end of the reboiler vessel to the flanged opening 98 at the other end. The heat exchange bundle slides into and rests on longitudinal skid bars 100 welded to the bottom of the tank in the area encompassed by the "U" slot 84 of the several baffles 82. Suitable reboiler vessel supports 102 are provided to support the reboiler vessel on the ground surface preferably positioned over the glycol storage tank 16 as shown in FIG. 1.

A simple pack type fractionation still 20 is positioned on the flanged opening 72 to return vaporized glycol back down into the reboiler vessel thus preventing loss of glycol overhead with the gases discharged from the reboiler. The top portion of the still is of lesser diameter and may be used as a condenser to furnish reflux to the still to remove glycol from the vapors. The vapors from which the vaporized glycol has been removed are sent to the stack for disposal as heretofore mentioned.

Liquid glycol passes from one compartment to the adjacent compartment by passing through the "U" slots in the baffles under the heat exchange bundle as shown at 172 by arrows in FIG. 4. Lean glycol overflowing through the overflow pipe 94 passes through the line 110 (FIG. 1) into the glycol storage tank 16 where its sensible heat is used to pre-heat incoming wet glycol to approximately 220° Fahrenheit as heretofore mentioned. The glycol storage tank 16 may also be supported on supports 102 which may in turn be situated on foundation supports 112.

Lean glycol is discharged from the storage tank 16 through valve 116 (FIG. 1) and discharge line 114 and cooled to near the absorption tower temperature by a suitable cooling coil indicated at 118. The lean glycol is then pumped back into the absorption tower 10 through pipe 120 with a conventional steam driven pump 122 having a suitable relief valve 124. By-pass equipment consisting of a by-pass line 126 having a valve 128 and a by-pass flow rate indicator 130, preferably of the rotameter type to determine the amount of glycol by-pass, may be provided to by-pass lean glycol to the cooling coil inlet line 114, thus saving heat required to dehydrate by-passed glycol when the gas load on the absorber is low. An auxiliary gas driven reciprocating pump driven by gas bled off the main gas stream leaving the absorber, may be provided as shown in FIG. 1. In the present arrangement, a gas pump having a control valve 134 and a conventional relief valve 136 connected thereto, is installed to operate as a standby or auxiliary pump. Such a gas driven pump can be supplied with dry gas from the absorber. Exhaust gas from the pump 132 is expelled to the stack through line 144.

The wet glycol in the reboiler vessel is heated by steam or other means for supplying heat at a suitable level, such as with gas burners. In the present process steam is heated by suitable steam generating equipment (not shown) and pumped through steam line 146 having a flanged orifice fitting 148 therein. The temperature of the steam fed into the heat exchange bundle in the reboiler to heat the glycol is controlled to maintain glycol at a constant temperature by a conventional temperature indicator control (not shown) connected to the heat exchange bundle 96 and the valve assembly 150. Steam condensate is removed from the heat exchange equipment 96 in the reboiler vessel 14 through line 152 and steam traps 154.

During operation of the glycol dehydration process, wet glycol from the absorber 10 is preheated in an exchanger in the glycol storage tank 16 and then flashed in the flash tank 18 to release the dissolved vapors which gases are subsequently scrubbed and utilized in the reboiler vessel to reduce the partial pressure in the vapor to thus cause the system to act as if the pressure were lower, thereby lowering the vaporization temperature of the glycol in the vessel. Wet glycol is run into the reboiler vessel through the funnel 70 and funnel stem 76 to a point near the end of the reboiler vessel end compartment 164; thus the glycol in the compartment 164 is the wettest glycol in the reboiler vessel. Glycol progresses from compartment 164 to compartment 166, thence to 168 and finally to compartment 170 before it is discharged from the reboiler vessel through the overflow pipe 94. The glycol passes from one compartment to the other by flowing under the heat exchange baffle inserts 97 through the area 172 as shown by arrows in FIG. 4. Unsaturated natural gas either bled off of the main natural gas stream 24 from the absorption tower 10 or scrubbed gas recovered from the wet glycol by flashing in flash tank 18 as heretofore mentioned, is fed into the reboiler vessel through inlet 56 into compartment 170 and thence into subsequent compartments 168, 166 and 164 through the tubular member 88, thus exerting its influence in each of these compartments through the longitudinal slot 90. The vapors over the boiling liquid in each compartment cannot mix with the vapors in other compartments except in the direction of gas movement since each compartment is sealed above the liquid level. Vapors over the liquid in one compartment pass to the next compartment through the tube 88 towards column 20 but cannot pass in the opposite direction since the gas pressure is higher at the liquid overflow end (compartment 170) than at the column end (compartment 164). The function of the gas furnished through the tube 88, in each compartment, is to reduce the partial pressure in the vapor to thus cause the system to act as if the pressure were lower whereby, the liquid in each compartment will boil at a lower temperature than it would without the gas. The gas as it passes through the tube carries water vapors from over the glycol solution in each compartment and thus has a drying effect on the glycol vaporized or boiling in each compartment. Accordingly, since the driest glycol is contacted by the driest gas and the wettest gas contacts the wettest glycol the well known counter-current contacting principle is utilized in dehydrating wet glycol by the present invention.

As an example of my present invention, wet glycol containing 96% glycol and 4% water was dehydrated to a 99% glycol solution at a temperature of 375° Fahrenheit, utilizing only the dissolved gases released from the wet glycol in the flash tank 18. Previously ten times this volume of gas was required to dehydrate the glycol at 375° Fahrenheit in a reboiler without baffles, or the glycol was regenerated by heating to a temperature of 410° Fahrenheit with no gas.

Although I have described my invention with a certain degree of particularity it is understood that the present disclosure has been made only by way of example and that numerous changes in the details of construction and the combination and arrangement of parts may be made without departing from the spirit and the scope of the invention as hereinafter claimed.

I claim:

1. Apparatus for dehydrating an aqueous glycol solution whereby an inert gas is utilized to reduce the boiling temperature of said glycol solution, comprising in combination:

an elongated horizontally disposed vessel,
means for heating said glycol solution in said vessel,
a plurality of baffles positioned within said vessel and dividing said vessel into several compartments horizontally,
means for introducing said glycol solution into a first end compartment,
means for introducing said gas into the opposite end compartment,
means in said first end compartment for discharging said gas together with water vapors carried therewith from said vessel,
means for passing liquid from said first end compartment to the adjacent compartments,
means in said opposite end compartment for discharging dehydrated glycol from said vessel, and
an elongated tubular member passing through each of said baffles in said vessel, said tubular member having an opening in each of the several compartments within said vessel and adapted to transmit said gas therethrough whereby said gas passes through each compartment.

2. Apparatus for dehydrating an aqueous glycol solution whereby an inert gas is utilized to reduce the boiling temperature of said glycol solution comprising in combination:

an elongated horizontally disposed vessel,
a plurality of baffles positioned within said vessel and dividing said vessel into several compartments horizontally, said baffles having openings therein,
means for introducing said glycol solution into a first end compartment,
means for introducing said gas into the opposite end compartment,
means in said first end compartment for discharging said gas from said vessel,
means for heating said glycol solution in said vessel, said heating means being positioned in said vessel and passing through said openings in said baffles, said openings in said baffles being of such configuration as to permit the passing of liquid glycol from said first end compartment successively to each adjacent compartment when said heating means are positioned in a vessel, means in said opposite end compartment for discharging dehydrated glycol from said vessel, and means for passing gas from one compartment to adjacent compartments, said last mentioned means being adapted to prevent backflow of said gas.

3. Apparatus for dehydrating an aqueous glycol solution whereby inert gases are utilized to reduce the boiling temperature of said glycol solution comprising in combination:

a horizontally disposed vessel, means for flashing said glycol solution to release dissolved gases therefrom, a plurality of baffles positioned within said vessel dividing said vessel into several compartments longitudinally, said baffles each having openings therein, means for introducing glycol into a first end compartment of said vessel, means for heating said glycol solution in said vessel to thereby produce water vapors and glycol vapors, said heating means passing through said openings in said baffles, said openings in said baffles being of such configuration as to permit the passage of glycol solution from said first end compartment successively to each adjacent compartment when said heating means are positioned in said vessel, means for introducing into the opposite end compartment said gases released from said flashed glycol, means in said opposite end compartment for discharging dehydrated glycol from said vessel, fractionation means in fluid communication with said first end compartment of said vessel, an elongated tubular member passing through each of said baffles in said vessel, said tubular member having openings therein in each of the compartments through which said tubular member passes, said tubular member being adapted to pass said vapors and said gases from said opposite end compartment successively through each compartment of said vessel, whereby said gases exert their influence in each compartment and whereby said vapors and said gases are conveyed into said fractionation means, said fractionation means being adapted to liquify and return said glycol vapors to said vessel as liquid and expel said water vapors overhead.

4. A method for dehydrating an aqueous glycol solution subjected to a pressure of 500–1500 p.s.i.g. and having gases dissolved therein, comprising the steps of:

reducing the pressure on said glycol solution to thereby release dissolved gas from said glycol solution, introducing said glycol solution into a first end compartment of a compartmented horizontally disposed vessel, heating said glycol solution in said vessel to thereby generate water vapors and glycol vapors, introducing said released gases into the opposite end compartment of said vessel to reduce the vaporization temperature of said glycol solution, passing said gases successively into adjacent compartments in said vessel whereby said gases pass into compartments having progressively higher water vapor content, passing said glycol solution from said first end compartment into adjacent compartments whereby said glycol solution passes into compartments contacted by progressively drier gases, said glycol solution ultimately passing into said opposite end compartment into which said gases are initially introduced, separating said water vapors from said glycol vapors in a packed column whereby said glycol vapors are returned to said vessel as liquid and said water vapors expelled overhead, and recovering dehydrated glycol from said opposite end compartment of said vessel.

References Cited by the Examiner

UNITED STATES PATENTS

| | | | |
|---|---|---|---|
| 2,685,941 | 8/54 | Kassel | 55—44 |
| 2,720,280 | 10/55 | Doyle | 261—21 X |
| 2,750,331 | 6/56 | Meyers | 202—153 |
| 2,780,304 | 2/57 | Pew et al. | 55—45 |
| 2,990,910 | 7/61 | Kimmell | 55—32 |
| 2,996,142 | 8/61 | Worley. | |
| 3,105,748 | 10/63 | Stahl | 55—32 |
| 3,105,749 | 10/63 | Gebert et al. | 55—53 |

REUBEN FRIEDMAN, *Primary Examiner.*

GEORGE D. MITCHELL, WALTER BERLOWITZ,
*Examiners.*